(12) United States Patent
Bray

(10) Patent No.: US 6,239,725 B1
(45) Date of Patent: May 29, 2001

(54) PASSIVE VISUAL SYSTEM AND METHOD OF USE THEREOF FOR AIRCRAFT GUIDANCE

(75) Inventor: George Bray, Toms River, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/575,497

(22) Filed: May 18, 2000

(51) Int. Cl.⁷ ........................................................ G08G 5/00
(52) U.S. Cl. .......................... 340/953; 114/258; 359/843
(58) Field of Search ............................... 340/947, 953, 340/954, 955, 956; 701/16; 73/178 T; 244/114 R; 280/5.507, 5.519; 359/843, 844; 114/261, 258, 270

(56) References Cited

U.S. PATENT DOCUMENTS

| | | | |
|---|---|---|---|
| 3,003,451 | * 10/1961 | Lundin et al. | 340/954 |
| 3,279,406 | * 10/1966 | Ricketts et al. | 340/955 |
| 3,537,066 | * 10/1970 | Stingl | 340/953 |
| 3,633,157 | * 1/1972 | Schuh | 340/954 |
| 4,667,196 | 5/1987 | Kaul | 340/954 |
| 5,922,039 | 7/1999 | Welch et al. | 701/116 |
| 5,982,299 | 11/1999 | Shemwell | 340/953 |

* cited by examiner

Primary Examiner—Brent A. Swarthout
(74) Attorney, Agent, or Firm—Ron Billi

(57) ABSTRACT

A landing guidance system is disclosed for use with helicopters or other aircraft during the terminal phase of approach to a marine structure, such as a moving ship at sea. Signals from shipboard pitch and roll position sensors are routed to a signal processor that computes stabilization corrections which, in turn, are applied to a multi-axis electromechanical system that moves internal elements of an optical system to compensate for motion of a shipboard platform resulting in a stabilized optical presentation in inertial space to the pilot of an approaching aircraft. A dual display is provided through the use of a spectral beam splitter that allows both an infrared and visible display to be presented to an approaching pilot. This allows the pilot to use the display with and without night vision devices. The visible energy display to the pilot is color-coded with three distinct colors.

38 Claims, 7 Drawing Sheets

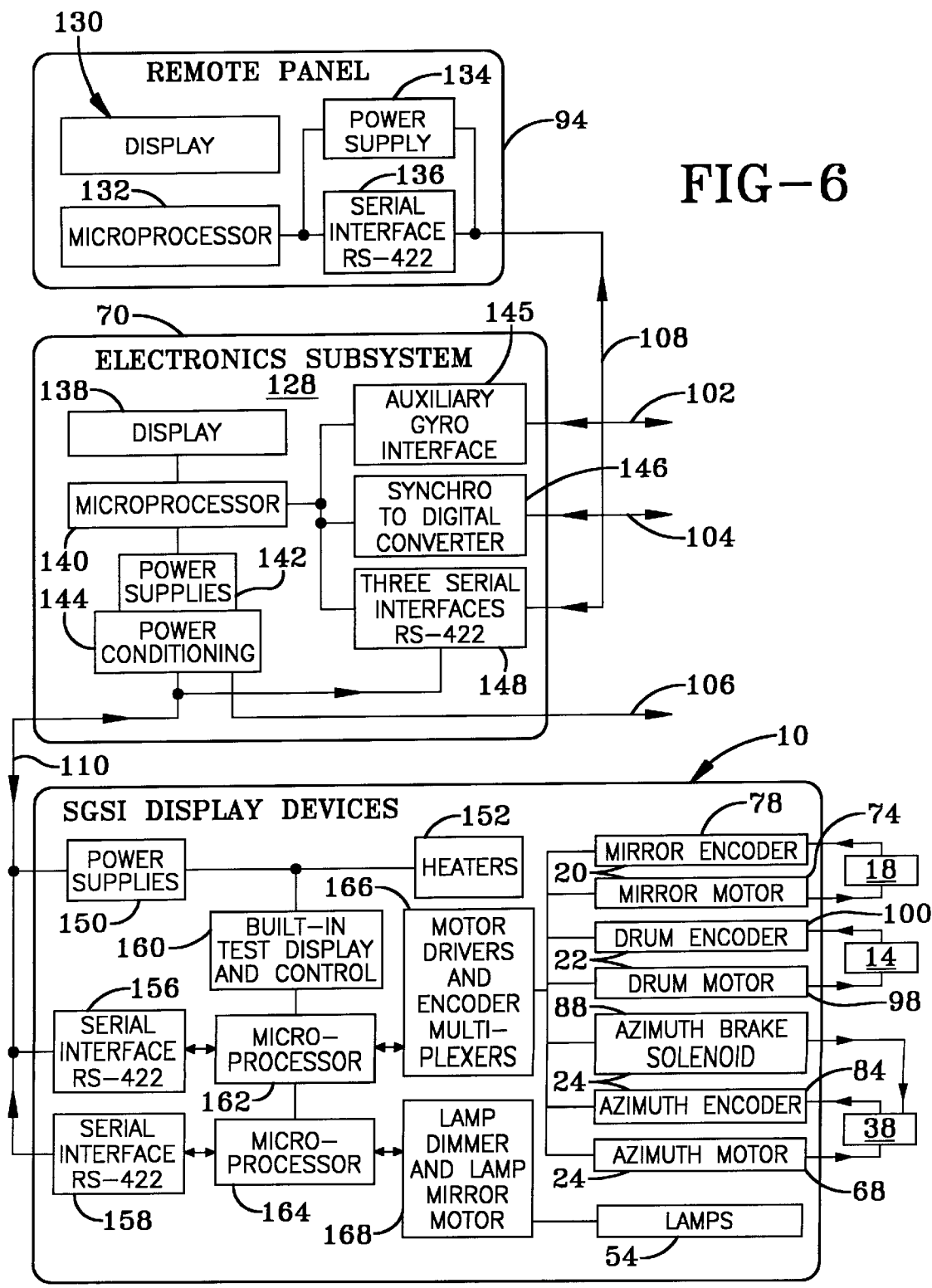

PASSIVE VISUAL SYSTEM AND METHOD OF USE THEREOF FOR AIRCRAFT GUIDANCE

ORIGIN OF THE INVENTION

The invention described herein was made in the performance of official duties by an employee for the Department of the Navy and may be manufactured, used, licensed by or for the Government for any governmental purpose without the payment of any royalty thereon.

BACKGROUND OF THE INVENTION 1.0 Field of the Invention

The present invention relates to a system and method for assisting an aircraft pilot during landing maneuvers and has particular use for landing helicopters aboard marine structures. More particularly, the present invention relates to visual landing aid systems for guidance of aircraft during final approach and specifically to passive, electro-optical display systems for enhancing visual cueing information projected to the pilot of an approaching aircraft from the point of intended landing on an helicopter pad using a Stabilized Glide Slope Indicator (SGSI) system.

2.0 Description of the Prior Art

Successful aircraft landings, particularly night time operations into short runways and into airports with long, over water approach patterns extending into a surrounding body of water, necessitate the highest degree of safety and control to ensure maximum protection for passengers, cargo and aircrew.

Current Stabilized Glide Slope Indicator (SGSI) devices, are optical landing aid devices that provide glide slope information to helicopter pilots at night and in foul weather. Such systems have been in use for over 30 years. The SGSI devices provide a pilot with visual cues for night landings so that a pilot can maintain desired altitude and rate of decent. Usually a copilot is mandatory to determine clearance altitude during such night landings. The U.S. Navy has developed and refined through land based flight testing landings using an advantageous 40 degree horizontal coverage so as to not fly out of coverage at one-half (½) nautical mile (nm).

Landing helicopters at night on small ships is a demanding and dangerous task. To reduce work load and improve safety visual cues were developed that illuminated the landing area and provided an approach light that would display glide slope or vertical height information to an approaching pilot. Initially gravity stabilization was used, as in the British Glide Path Indicator (GPI), but the stabilization accuracy of this device was insufficient to provide consistent glide slope information. A number of navies, including the U.S. Navy, developed stabilized platforms on which to place landing lights. These platforms were physically large, costly and created maintenance problems. They also did not compensate for heave motions. The moving parts of these devices are also disadvantageously exposed to environmental effects such as wind loading, ice loading and the hostile electromagnetic environments present on modern warships. Their displays also have to be disadvantageously manually rotated to point at different approach paths. Furthermore, with the advent of Night Vision Devices (NVD's), the displays were rendered useless since the display information was color coded and the NVD's can not discern colors. The large size and complex shape of the display systems gave them a large radar gross-section, which is undesirable in new ship design. The large size also makes it difficult to locate these indicator systems on crowded hanger decks or ship superstructures. This is particularly difficult if a low radar cross section is desired for such a system. Many of the world navies use displays different from the U.S. Navy and the design of these systems is such that the display cannot be changed without a complete redesign of the optical system.

U.S. Patents that relate to apparatus and methods for aiding in helicopter landings include U.S. Pat. No. 5,982,299, entitled "Laser Based Visual Landing Aids and Method for Implementing Same." This teaching discusses some of the functional SGSI system requirements. In particular, helicopter operations in land and sea based environments using laser visual landing aid corridor designs for azimuth guidance upon approaching a helicopter landing zone (or pad), have a central amber (first) corridor that is slightly wider than that used for carrier or land-based fixed wing aircraft facilities. For helicopter landing zone landing aid systems, this teaching discusses the use of a central corridor that is 0.6 degree in width, plus or minus 0.1 degree. The steady red and green (second and third) corridors use a 0.8 degree plus or minus 0.1 degree, and the slowly flashing red and green (fourth and fifth) corridors are widened to 0.4 degree, plus or minus 0.04 degree. There are no rapidly flashing corridors in that design. Vertical height of each of the corridors is in the range of 4 to 5 degrees. However, this teaching does not discuss how to make an SGSI system with using only electromechanical moving optical components within a housing mounted to a moving marine structure. Furthermore, laser sources are required for this type of implementation for U.S. Pat. No. 5,982,229 and this presents a potential laser eye safety hazard.

U.S. Pat. No. 4,667,196 ('196) entitled "Active Visual Display System for Remote Three-Axis Flight Path Guidance of Landing Aircraft," teaches an active, electro-optical display system for use on fixed-wing, land based airport runways, which provides for remotely guiding a pilot during visual approach and landing of an aircraft using one embodiment termed "Conventional Microwave Landing System (MLS)." The system of the '196 patent uses ground transmitted data that is air-derived on board the aircraft and data linked to a ground receiver to produce a continuous digital data signal indicative of aircraft slant range, elevation and azimuth relative to the desired landing position. As described in the '196 patent, the resulting data signal is electrically coupled to a signal processor controlled in accordance with control guidance parameters to produce three discrete control signals indicative of (1) the magnitude and direction of the descent rate error, (2) the flight path acceleration, and (3) the lateral drift rate of the aircraft relative to the intended landing area. The three control signals are respectively coupled to display drivers which produce a plurality of drive signals for energizing individual light cells in horizontally oriented linear arrays located adjacent to the runway. The resulting light signals provide a continuous visual indication of the flight path acceleration and flight path angular error, in the elevation and azimuth planes, for appropriate corrective action by the pilot. However, this teaching does not teach or suggest an apparatus or method that compensates for marine platform motions of pitch and roll during aircraft landing so as to provide a pilot with helpful guidance information on a moving platform. This teaching of the '196 patent, requires active aircraft tracking with MLS and Distance Measuring Equipment (DME) or other tracking devices. It also requires a VASI system, which is a physically large display.

U.S. Pat. No. 5,922,039 ('039) entitled "Actively Stabilized Platform System," teaches of a method to perform two axis stabilization without the use of a gyroscope by using accelerometers, position sensors and proportional drive controller augmented with estimation and filtering. However, the '039 patent does not teach or suggest an apparatus or method that compensates for marine platform motions of pitch and roll by providing moving optical elements during aircraft landing so as to provide a pilot with helpful guidance information on a moving platform. Whereas the '039 patent discloses a method of deriving signals to drive a stable platform, it does not teach or suggest of either a method for moving optical elements or creating a stable display in space for various azimuth angles.

Other limitations of presently used SGSI systems aboard marine structures include hydraulic systems for actuation and control that generally require the use of several gallons of hydraulic oil for operation. These ancillary hydraulic systems require frequent and extensive maintenance where hydraulic fluid is changed every six months and exposed mechanical joints must be greased which results in storage of many solvents and waste materials onboard a marine structure such as a ship where storage is often at a premium. These shipboard wastes require the storing of containers, rags, gloves, foot covering, face shields, and aprons needed for regular maintenance. The ship must store oil for waste disposal at appropriate shore facilities. The hydraulic oils used in this system usually disadvantageously react with aluminum and steel parts causing corrosion.

Thus, replacement of current SGSI systems having hydraulic systems is desirable in view of extensive maintenance requirements and their high initial capital expense, several times as expensive as the proposed invention. An improved system having the required display presentation and performance requirements of currently used systems comprising electronic and optical components is desirable and which the present invention provides.

OBJECTS OF THE INVENTION

It is a primary object of the present invention to provide a passive visual landing aid system whose operation includes compensating for landing area platform motions of pitch and roll and that presents visual cues to a pilot in an integrated format of stable glide slope information resulting in increased flight safety and reduced pilot workload.

It is another object of the present invention to provide an improved landing aid system for remotely guiding the descent approach of a helicopter to a moving marine structure platform, in such a manner that does not add significant vertical obstructions to the landing area.

Yet another object of the present invention is to provide an SGSI device that obviates the need for hydraulic systems and minimizes the expense to implement and use on a marine structure.

In addition, other objects of the present invention include: 1) minimization of the effects of wind and ice loading on system components that are exposed on a weather deck of a marine structure; 2) improved electromagnetic interference shielding of system electronics; and 3) a system whose display device has a smaller physical aspect relative to prior art devices and that can be located on or within a superstructure of a ship resulting in a smaller radar cross section.

Still another object of the present invention is to provide a reliable passive optical electro-optical display system that enhances visual cueing information presented to the pilot while approaching a moving marine structure.

Furthermore, another object of the present invention is to provide means for stabilizing the optics that results in a relatively smaller system compared to existing system and which requires smaller servo-motors having reduced power requirements, thereby resulting in a more accurate system control compared to existing SGSI systems that generally require movement of the entire optical display.

SUMMARY OF THE INVENTION

The present invention is directed to a passive electro-optical display system for use with helicopters or other aircraft on shipboard platforms by providing a landing guidance system for use during the terminal phase of approach of a marine structure, such as moving ship at sea. Signals from a shipboard pitch and roll position sensor are routed to a signal processor of the present invention that computes stabilization corrections. The stabilization correction signals are applied to a multi-axis electromechanical system comprised of first, second and third actuator assemblies, that moves internal elements of an optical system to compensate for motion of a shipboard platform resulting in a stabilized optical presentation in inertial space to the pilot of an approaching aircraft. A dual display, consisting of visible and infrared energy, provided by the present invention through the use of a spectral beam splitter that allows both an infrared and visible energy directed onto a rotating mirror to be presented to an approaching pilot. This allows the pilot to use the display with and without night vision devices. The optical display, taking the form of visible energy, presented to the pilot is color-coded for providing three distinct color zones. The optics of the present invention are focused such that at the interfaces of these zones there are color mixing that provides a visual cue of transition between the color zones. The display for night vision devices is divided into upper and lower halves regions, each of which preferably has different flash rates. These regions can be further broken into zones that either have a plurality of flash rates or vary in duty cycle to advantageously provide an unambiguous monochromatic indication of vertical position to an approaching pilot.

BRIEF DESCRIPTION OF THE DRAWINGS

These and other objects, features and advantages of the invention, as well as the invention itself, will become better understood by reference to the following descriptions when considered in conjunction with the accompanying drawings, wherein like reference numbers designate identical or corresponding parts throughout and wherein:

FIG. 6 is a block diagram of the electronic components shown in FIG. 5.

DETAILED DESCRIPTION OF THE PREFERRED EMBODIMENTS

In general, the invention comprises a passive electro-optical display system for aircraft landing use that provides visual cueing for aircraft on final approach to a moving marine structure platform, (particularly a ship). More particularly, the system and the method of operation thereof include stabilizing optical components within a Stabilized Glide Slope Indicator (SGSI) display device of the present invention. The system of the present invention, interchangeably referred to herein as SGSI system 100 or landing guidance system 100, further includes hardware that compensates for shipboard motions such that the optical output display presented to a pilot will appear fixed in inertial space to an approaching aircraft landing on a marine structure. In addition, the present invention has a dual output display using standard visible light output and an infrared display that is compatible with Night Vision Devices (NVD) when used by the pilot.

Figure 1:
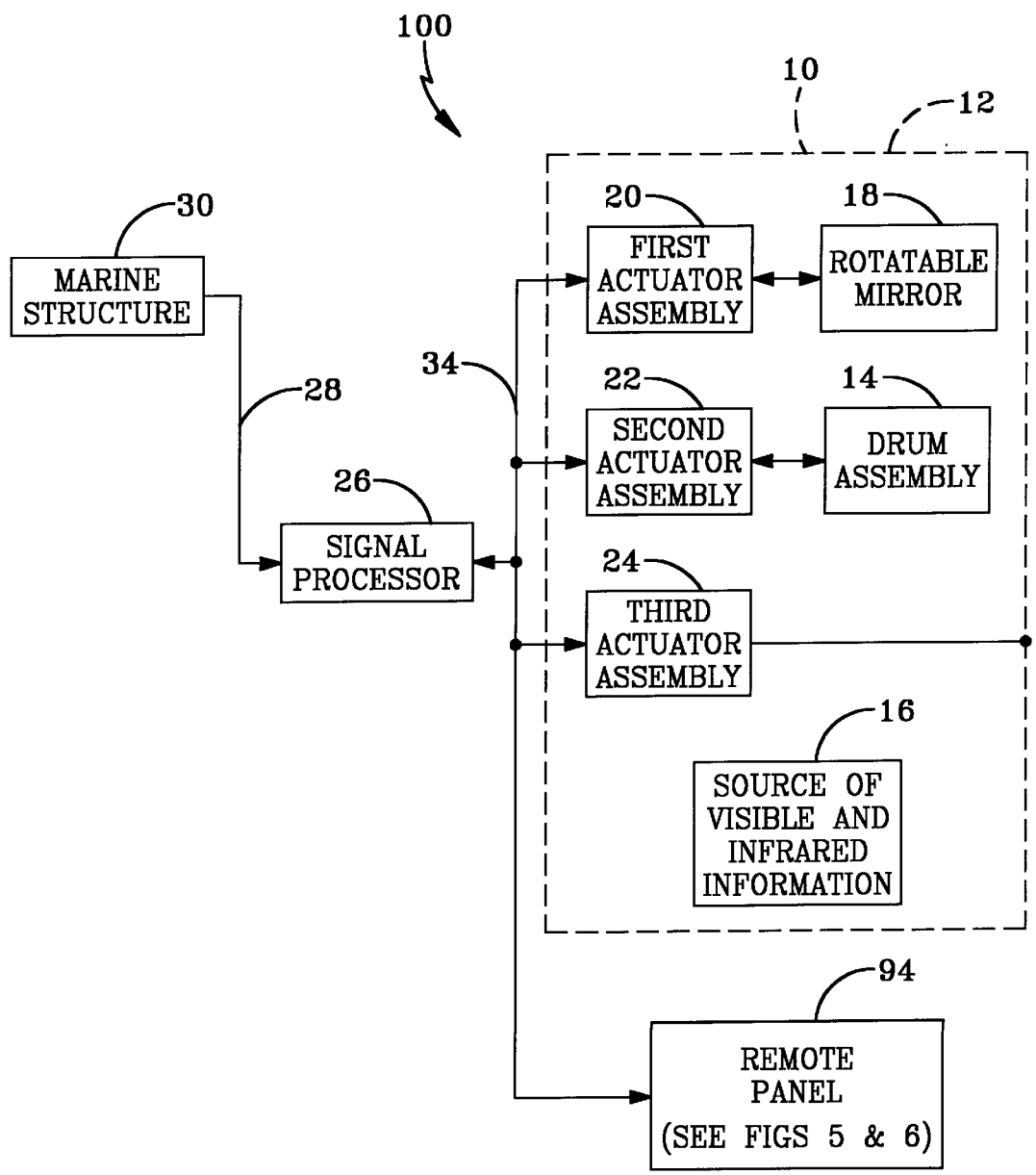
FIG. 1 is a block diagram of the system of the present invention.

In general, the SGSI system 100 serves as a landing guidance system shown in FIG. 1 and comprises an SGSI display device 10 that is confined within an enclosure 12. The SGSI display device 10 comprises a housing or drum assembly 14 holding optical components, a source 16 of visible and infrared information, and a mirror 18 rotatable to predetermined positions and presenting the visible and infrared information to an approaching pilot. The SGSI display device 10 further comprises first 20 second 22 and third 24 actuator assemblies.

The landing guidance system 10 further comprises a signal processor 26, which may be comprised of one or more microprocessors located at one or more locations within the landing guidance system 10. The signal processor 26 receives output signals 28 from sensors of a marine structure 30, such as a ship, indicative of the motion, such as, pitch and roll, being experienced by the ship. The signal processor 26 generates output signals on a signal data bus 34 which are routed to the first 20, second 22, and third 24 actuator assemblies. The signal processor 26 also generates output signals on signal data bus 34 which are routed to a remote panel 94 to be further described hereinafter with reference to FIGS. 5 and 6.

The first actuator assembly 20 interconnected to the rotatable mirror 18 is responsive to output signals on data bus 34 of the signal processor 26 so as to compensate the predetermined positions of the rotatable mirror 18 relative to the motion of the marine structure 30. The second actuator assembly 22 interconnected to the drum assembly 14 is responsive to the output signals on data bus 34 of the signal processor 26 so as to move the drum assembly 14 relative to the rotatable mirror 18 in as manner so as to compensate for the motion of marine structure 30. The third actuator assembly 24 interconnected to enclosure 14 of the SGSI display device 10 is responsive to the output signals on data bus 34 of the signal processor 26 so as to direct the orientation of the enclosure of the SGSI display device 10 for azimuth training with respect to the marine structure 30.

Figure 2:
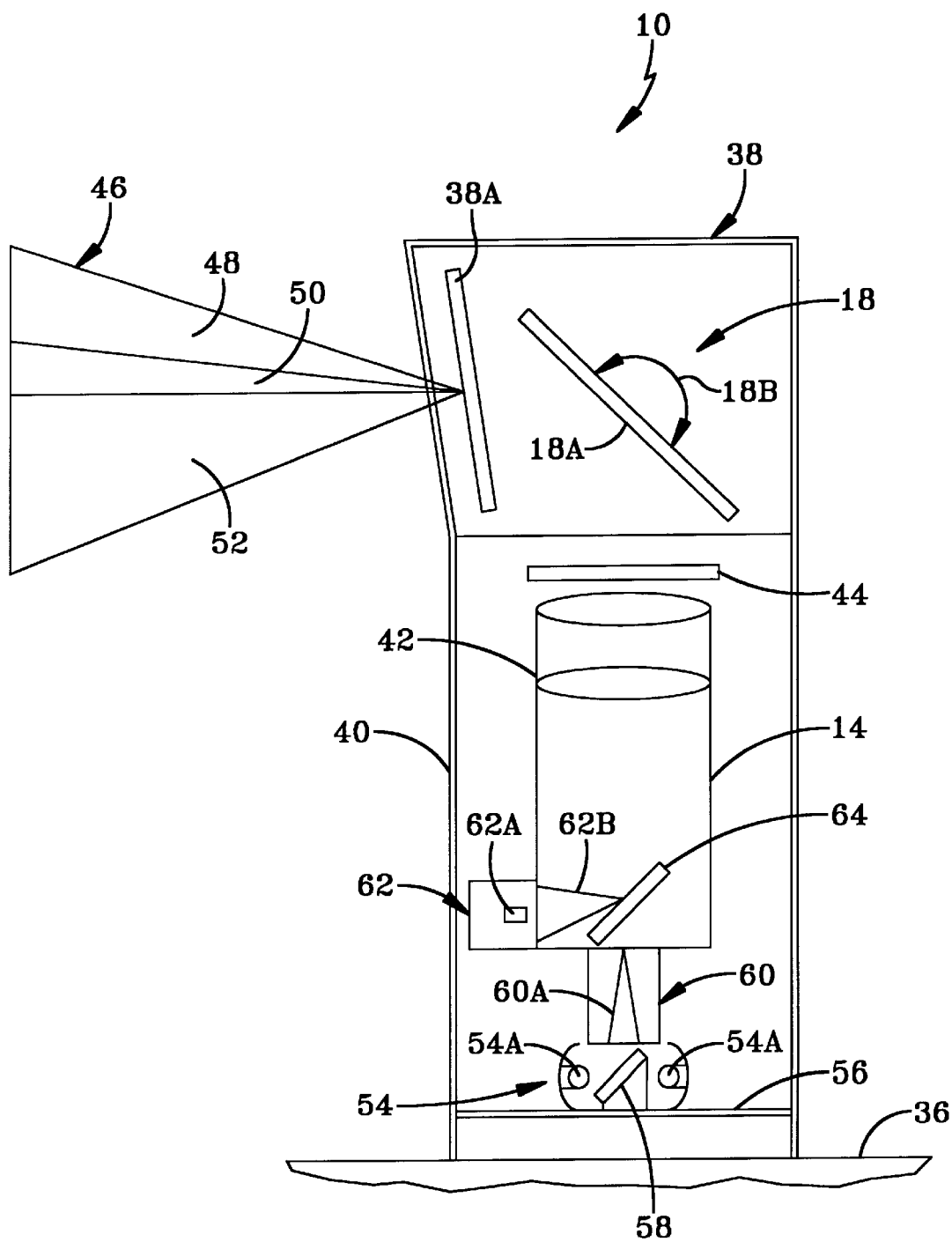
FIG. 2 diagrammatically illustrates a Stabilized Glide Slope Indicator (SGSI) display device of the present invention.
Figure 3A:
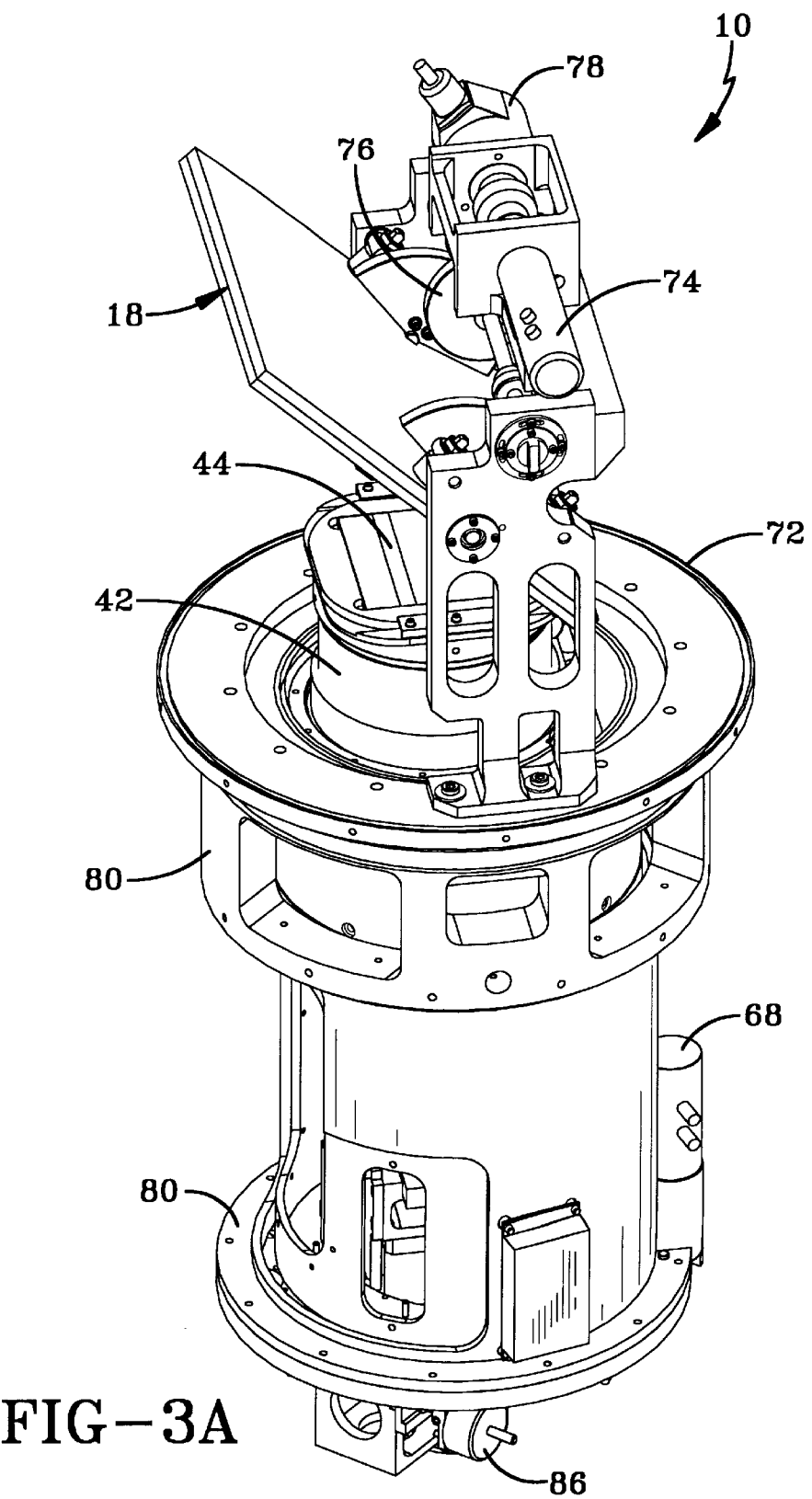
FIG. 3 is composed of FIGS. 3a and 3b that show a preferred embodiment of the SGSI display device in both a side and a bottom isometric view respectively.
Figure 3B:
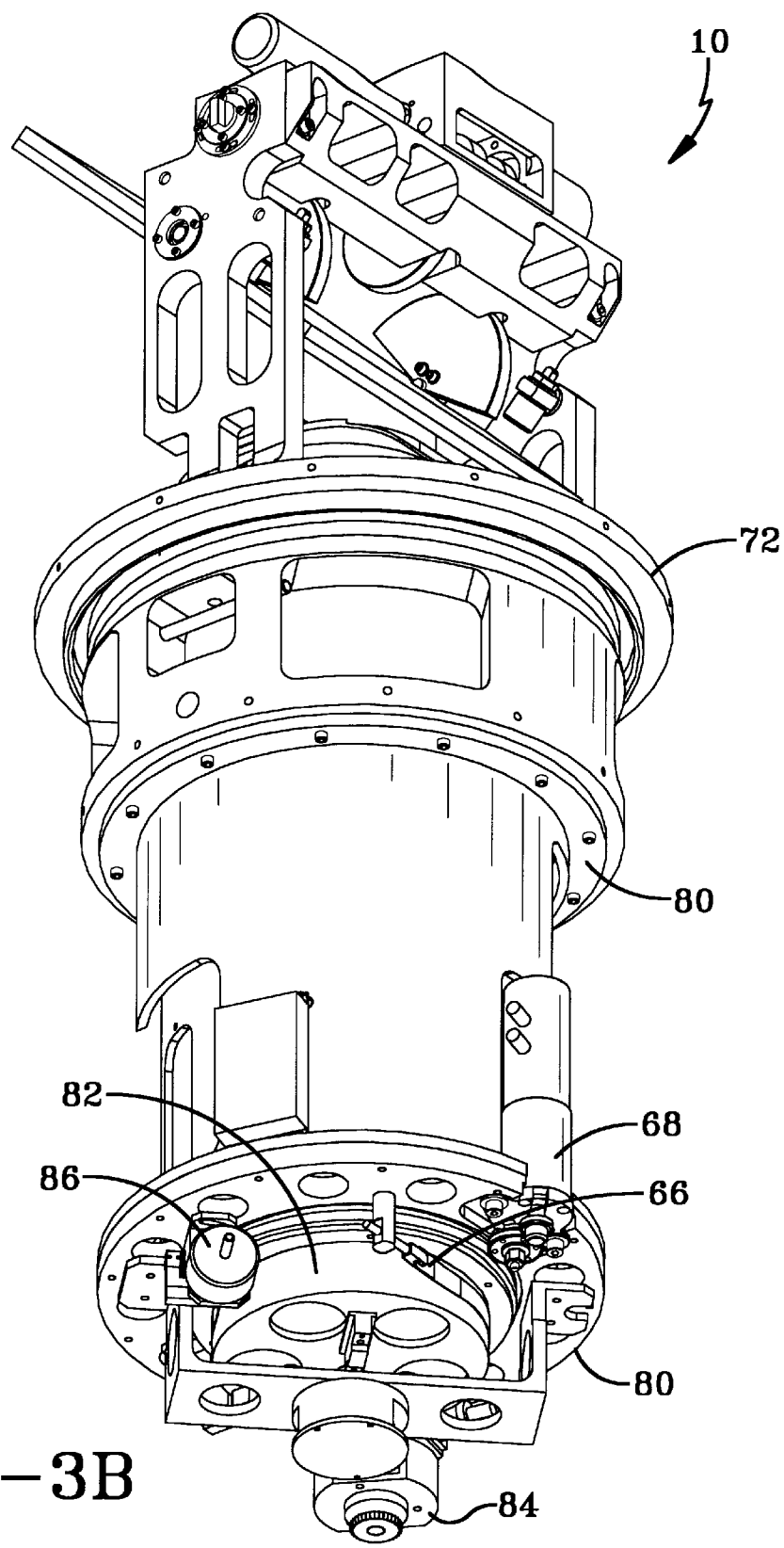

With reference to the drawings, FIG. 2 and FIGS. 3a and 3b (respectively illustrating isometric side and bottom views), it is shown that the Stabilized Glide Slope Indicator (SGSI) display device 10 is mounted to a ship's flight deck 36. The SGSI display device 10 is shown substantially raised above the flight deck 36, but can be readily modified and be positioned below the flight deck 36 wherein the rotating head member 38 is still raised above the flight deck 36. A display housing 40 supports the rotating head member 38 and the rotating drum member 14. The entire assembly making up the SGSI display device 10 is preferably made of corrosion resistant material, such as stainless steel or anodized aluminum.

There are three actuator assemblies 20, 22 and 24, previously discussed with reference to FIG. 1, located in the display housing 40. A first actuator assembly 20 rotates the reflecting mirror 18 that resides in the head member 38. A second actuator assembly 22 causes the drum assembly 14 to rotate the optical presentation about the perpendicular to the reflecting mirror 18. The third actuator assembly 24 rotates the head member 38, which contains the reflecting mirror 18 and drum assembly 14, in azimuth.

FIG. 2 represents a side cutaway view, which depicts one of the embodiments of the SGSI display device 10 contained within a three-axis stabilization arrangement in the housing 40. FIG. 2 illustrates the rotatable reflecting mirror 18 as having a rotation axis 18A rotatable in the directions indicated by bi-directional arrow 18B. The reflecting mirror 18 rotates about its mid-point corresponding to rotation axis 18A so as to change the vertical angle of the output light pattern 46. The output light pattern 46 passes through an output window 38A which seals the SGSI unit 10 from the environment.

The SGSI display device 10 in one embodiment has a wide field of view lens 42 that magnifies a line of light 0.20" high by 4" wide to form a virtual image of the line source that appears to be 57" behind the face of the lens 42. The approaching pilot views this line of light through a tri-colored filter 44. The filter 44 colors the light and divides it into three precisely controlled vertical angles. In the display viewing field observed by an approaching pilot, there are 6.5 degrees of red, in the lower section of emitted light, one-degree of yellow in the center section, and 1.5 degrees of green in the upper section. These fields are about 40 degrees wide in the horizontal. The three different colors are shown in FIG. 2 as being confined in the light pattern 46 (9° H×40° W) with the green color in region 48, the yellow light in region 50, and the red light in region 52. The optics of the present invention, which include the lens 42 and the tri-colored filter 44, are focused such that at the interfaces of the regions 48, 50 and 52 there are color mixing that provide a visual cue of transition between the color regions 48, 50 and 52.

The tri-colored filter 44 uses dichroic coatings for efficiency and precise control of the color regions. The line of light is formed from one of three available reflectorized lamps 54, which is attached to the rotating drum 14. Each of the reflectorized lamps 54 has a holder 54A. Three lamps 54 are used to provide for spares in the event that a lamp fails. The lamp is selected by a 45 degree turning mirror 58 that can be rotated about its vertical axis to deflect light from the selected lamp 54 into a fiber optic circle to line converter 60, which converts the circular light pattern of the lamp 54 to a line in a manner known in the art. The turning mirror 58 may be responsive to an external source, such as a microprocessor, in a manner to be hereinafter described. The output from fiber optic circle to line converter 60 forms the visual image for the lens 42, which acts as a magnifying lens.

A second output display incorporated into the system provides glide slope display information to a pilot using night vision goggles. This image is formed by six linear arrays of near IR LED's arranged in a vertical stack 62 that output infra-red radiation. Each section of the vertical stack 62 is represented by the nomenclature 62A shown in FIG. 2. The vertical stack 62 provides the infrared energy of source 16 of FIG. 1, which also includes the visible energy provided by the reflectorized lamps 54 and the fiber optic circle to line converter 60.

With regard to the infrared energy provided by the vertical stack 62 there are several different information codes that can be used to provide infrared information to an approaching pilot. These codes are flash frequency coding and a combination of flash rate and duty cycle modulation which provides the pilot with distinct vertical approach paths. For example, a display used for infrared energy detectable by night vision devices may be divided into upper and lower regions, each of which preferably has different flash rates. These regions can be further broken into zones that either have a plurality of flash rates or vary in duty cycle to advantageously provide an unambiguous monochromatic indication of vertical position to an approaching pilot.

The codes may be produced by stand-alone logic contained in the vertical stack 62, or if desired, may be produced appropriate logic in the vertical stack 62 along with an appropriate routine running in the signal processor 26, and more particularly a microprocessor, to be described hereinafter, serving the vertical stack 62. The vertical stack 62 is located at the focal point of the lens making it appear to be at infinity. The height of each section 62A of the vertical stack 62 controls its vertical coverage and the length of each section 62A of the vertical stack 62 controls its horizontal coverage. A spectrally controlled beam splitter 64 is used to combine the two optical systems into one common display, that is, the infrared information produced by the vertical stack 62 and the visual information produced by the reflectorized lamp 54 and the fiber optic circle to line converter 60. The visible display formed by the fiber optic circle to line converter 40 passes through the beam splitter 44 with minimal attenuation and the IR display produced by the vertical stack 62 is reflected off the beam splitter 64, effectively combining the two displays.

In general, and as to be further described, stabilization is accomplished by the first actuator assembly 20, to be further described with reference to FIG. 6, within the SGSI display device 10 by moving the reflecting mirror 18 about its axis 18A to stabilize for pitch of a ship when the SGSI display device 10 is facing aft on the ship on which the SGSI display device 10 is mounted. One degree of reflecting mirror 18 movement corrects for two degrees of ship motion. This axis 18A of the reflecting mirror 18 is also used to control the vertical pointing or basic angle of the SGSI display device 10 and can be used to correct for heave motion of the deck 36. Heave correction is performed by pointing the output display of the SGSI display device 10, comprised in light pattern 46, through a fixed point from the head member 38 in inertial space at about half of the visual range of the SGSI display device 10. This is typically about ¾ of a nautical mile from the SGSI display device 10. A second stabilization, controlled by the second actuator assembly 22, to be described with reference to FIG. 6, is accomplished by rotating the cylindrical drum assembly 14 portion of the housing 40 that contains the optical components with respect to the reflecting mirror 18 axis. The rotation of the cylindrical drum assembly 14 compensates for ship roll motion when the SGSI display device 10 is facing aft. A third stabilization axis, controlled by the third actuator assembly 24, to be described with reference to FIG. 6, is the azimuth position axis, which points the entire display of the SGSI display device 10 to the desired azimuth approach. The azimuth angle can range to +/−90 degrees of its installed position that usually faces aft (180 degrees relative). When the azimuth orientation is rotated, the head member 38, reflecting mirror 18, and drum 14 rotate together in the outer housing 40 of the SGSI display device 10 with the drum assembly 14 not moving with respect to the reflecting mirror 18. When the SGSI display device 10 is facing aft or in line with the ship's motion axis, the stabilization is one for one. That is, the SGSI system 100 of the present invention moves the same amount as the ship and thus stays level to the inertial reference of the ship. For one degree of ship pitch, the output light beam, comprised in the light pattern 46, needs to be moved one degree thus the reflecting mirror 18 moves ½ degree. Similarly, for one degree of ship's roll the cylindrical drum assembly 14 would roll one degree in the opposite direction. If the azimuth axis is not lined up with the motion axis of the ship, coordinate transforms or stabilization equations, to be described hereinafter, need to be used to calculate the correct motions of the reflecting mirror 18 and the drum assembly 14.

When using the SGSI system 100 of the present invention, an operator chooses the desired approach azimuth and enters it into the SGSI system 100. The SGSI system 100 then releases an azimuth brake 66 (see FIG. 3(b)) and the azimuth motor 68 drives to a commanded position. The azimuth motor 68 is then de-energized and the azimuth brake 66 is applied.

The SGSI system 100 of the present invention sends the azimuth position to the processor that is part of the signal processor 26 of FIG. 1 in an electronic enclosure 70 (see FIG. 5), which uses this value for the stabilization calculations. The stabilization imparted to the output display of the SGSI display device 10 from the SGSI system 100 of the present invention is performed by moving the internal optical elements of the system, as opposed to moving the entire display device as is currently performed by existing SGSI systems. The SGSI system 100 of the present invention uses serial digital communication, which is included in the data bus 34 of FIG. 1, to be further described with reference to FIG. 6, between the three major subsystems comprising the SGSI system 100, whereby only one small power and signal transmission cable connects each of these major subsystems.

The SGSI system 100 of the present invention compensates for ship motions that include ship pitch and roll and to a lesser extent ship heave and location heave due to ship pitch and roll. Thus the stabilization system, considered to be part of the present invention, needs to compensate for two rotational and one translational motion. These motions need to be compensated for with the output display pointed to any of the required approach azimuths. The SGSI system 100 encompasses control of two orthogonal stabilization axis and one rotational axis for azimuth pointing. The two stabilization axis are in line with the ship pitch and roll axis only when the azimuth is aimed aft. Approaches from the bow are not used in the practice of the present invention. Since the output display axis of the SGSI display device 10 and the ship axis are not parallel, coordinate transforms, to be described hereinafter, need to be performed to determine the proper motion for the SGSI display device 10 motion axis. Vertical motion from ship heave and heave due to location is compensated for by the present invention by pointing the output display of the SGSI display device 10 through a point in inertial space located on the approach center line at about half of the useable range of the output display from the head member 38.

The stabilization of the displayed information associated with the present invention is accomplished, and may be seen in FIG. 2, by arranging the optical components so the source of either visible light, (shown in beam 60A) or infrared radiation (shown in beam 62B) is directed straight up at a rotating reflecting mirror 18 that reflects the impinging radiation through ninety degrees so it can be viewed by the approaching pilot. As previously mentioned, if the reflecting mirror 18 is rotated about its horizontal center, that is, rotational axis 18A, it reflects impinging light two degrees for every degree that the reflecting mirror 18 is rotated. When the azimuth axis is pointed aft, the reflecting mirror 18 can correct for ship pitch. If the azimuth axis is pointed in either a port or starboard direction, the reflecting mirror 18 would compensate for ship roll. For other azimuths, the reflecting mirror 18 axis 18A can compensate for a combination of pitch and roll as determined by coordinate transform equations, to be discussed hereinafter. The other stabilization axes are accomplished by rotating the vertically facing display of the SGSI display device 10 with respect to the reflecting mirror 18. When the output display of the SGSI display device 10 is facing aft in azimuth, this rotation axis compensates for ship roll. For azimuth training, the entire display of the SGSI display device 10 is rotated within its outer housing 40. Next, dependent upon the azimuth angle, a set of coordinate transform equations compute the predetermined position of reflecting mirror 18 and the rotation axis angles based upon input signals to the signal processor 26 (see FIG. 1) of ship pitch and roll information provided by the marine structure 30. Vertical translations are handled independently when required by a set of equations that: modify the angle of the reflecting mirror 18 such that the center of the light display, embraced by the visual and infrared energy display pattern 46 of the SGSI display device 10, is aimed through a point in inertial space. Further details of the SGSI display device 10, may be further described with reference to FIGS. 3(*a*) and 3(*b*).

FIGS. 3(*a*) and 3(*b*) respectively show one embodiment of the SGSI display device 10 in side and bottom isometric views. In these views the SGSI display device 10 is shown removed from its outer cylindrical case 40 and the hood and window unit (not shown) is also removed from the hood support ring 72. The reflecting mirror 18 is a front surface mirror and is known in the art. Furthermore, the components shown in FIGS. 3(*a*), 3(*b*), and 4, such as the drive motors and encoders, are of the conventional type and are known in the art.

The reflecting mirror 18 is used to provide motion compensation for the SGSI display device 10 in the vertical axis. The reflecting mirror 18 is driven mechanically by a brushless direct current (DC) harmonic drive motor 74 coupled to a zero backlash harmonic drive reducer (not shown) that is part of the harmonic drive motor 74. The harmonic drive motor 74 is coupled mechanically to: 1) the reflecting mirror 18 through a two step spur gear reducer 76; and 2) to the output of a mirror encoder 78, which provides positional feedback for the rotatable reflecting mirror 18. The rotatable reflecting mirror 18 is stabilized with a digital control loop from a microprocessor (not shown in FIG. 3(*a*),but to be described hereinafter with reference to FIG. 6) located in the SGSI display device 10. Azimuth pointing is accomplished by rotating the entire display mechanism (everything but an inner assembly 80) within the outer casing 40 (not shown) of the SGSI display device 10. When the SGSI display device 10 is rotated in azimuth, both the axis (pitch) of the reflecting mirror 18 and drum axis (roll) of the drum assembly 14 (see FIGS. 1 and 2) are fixed and rotate together in azimuth. The hood support ring 72 is part of the display and rotates when azimuth is changed, thus pointing the reflecting mirror 18 and hood (not shown) toward the desired approach path being used by the pilot. The azimuth motor 68 is also a brushless DC motor, which includes a harmonic drive speed reducer. The azimuth motor 68 is coupled to the azimuth drum assembly 82 (see FIG. 3B) by a belt drive. An azimuth encoder 84 is coupled to the azimuth axis through a drive belt and a gear reducer such that the full range of the azimuth encoder 84 is scaled to 180 degrees of azimuth rotation. When the azimuth axis is not being driven, the azimuth axis is locked in position with a band brake 66. When the azimuth axis is moved the band brake 66 is released by energizing the azimuth brake solenoid 86. Further details of the SGSI display device 10 may be further described with reference to FIG. 4.

Figure 4:
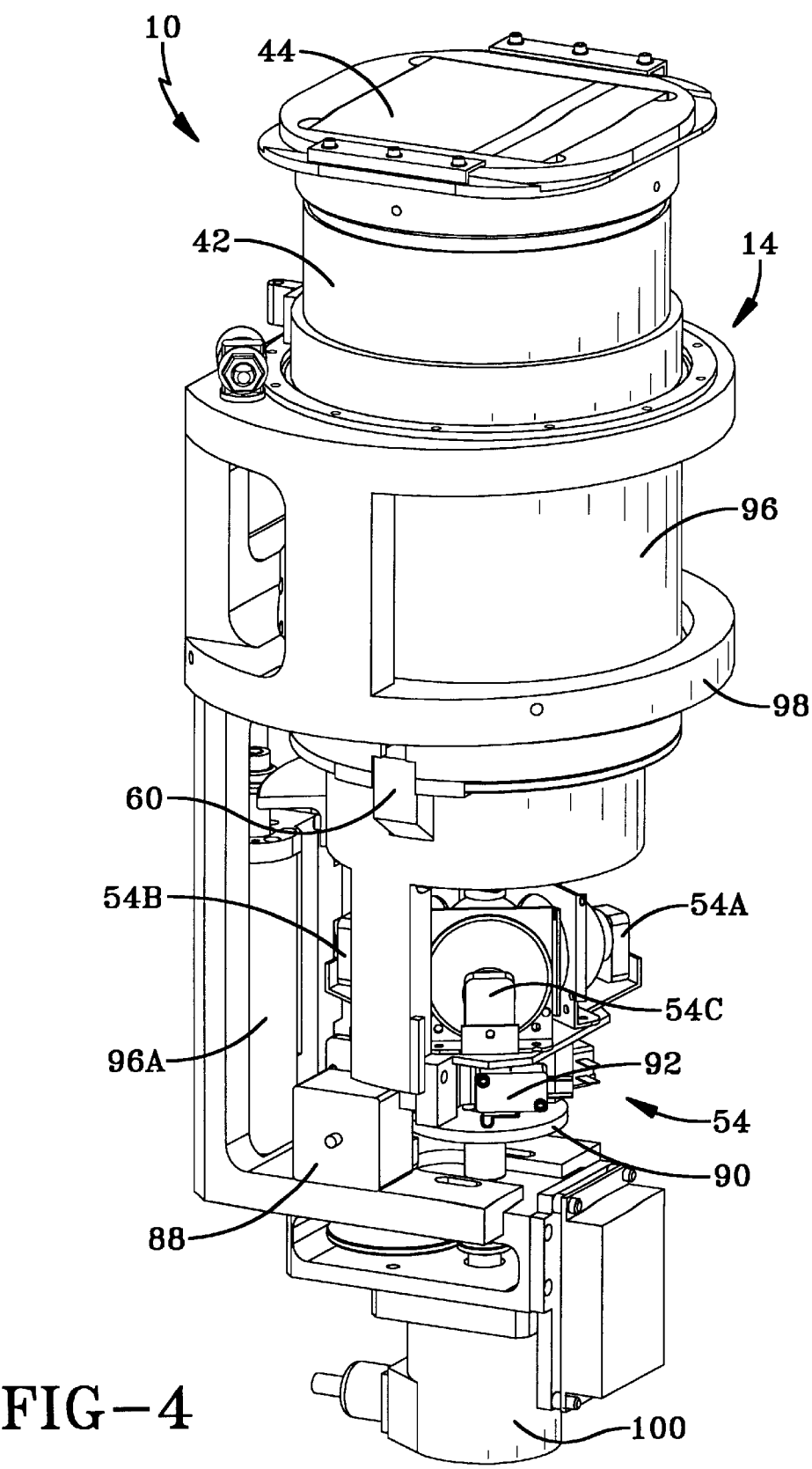
FIG. 4 shows the roll assembly removed from the SGSI display device shown in FIG. 3.

FIG. 4 shows the drum roll assembly 14 of FIG. 1 removed from the SGSI display device 10 of FIG. 3. The optical output display as viewed by the pilot is a virtual image formed by the optics of the SGSI display device 10 and viewed through the reflecting mirror 18. The virtual image is formed by the wide field of view (FOV) lens 44 in conjunction with the fiber optic circle to line converter 60 and is viewed through the tri-color filter 44. The fiber optic circle to line converter 60 is illuminated by one of three redundant reflector lamps 54 having respective holders 54A, 54B and 54C, that are selected by the rotatable 45 degree turning mirror 58. In the event of a lamp failure, the electronics, to be described hereinafter, will detect no current flow in the lamp circuit and the step motor 88 will then turn a worm gear that mates to a drive gear 90. The drive gear 90 is connected to the 45 degree turning mirror 58, which rotates the turning mirror 58 to the next good reflector lamp 54. When the turning mirror 58 reaches the next reflector lamp 54, a micro-switch 92 is positioned which actuates the next reflector lamp 54. All lamps are tested during SGSI system 100 initialization by passing a small current through their filaments. The SGSI device 10 has a microprocessor, to be described hereinafter, that transmits the lamp information to a remote control panel 94, also to be described hereinafter.

Roll stabilization with respect to the azimuth position is accomplished by rotating a roll drum housing 96. The roll drum housing 96 rotates in the outer roll drum support 98 that is attached to the azimuth drum 82. The roll drum housing 96 is rotated by the roll drum motor 96A through a sector gear. This drum motor 96A is also a brushless DC motor with a zero backlash harmonic drive. Position feedback is derived from a drum encoder 100 connected to the roll drum housing 96 through a gear reduction such that one rotation of the encoder 100 represents +/−25 degrees of roll motion. The beam splitter 64 and vertical LED stack 62 shown in FIG. 2 are located inside the roll drum assembly 14, but are not shown in FIG. 3. Further details of the SGSI display device 10 may be further described with reference to FIG. 5.

Figure 5:
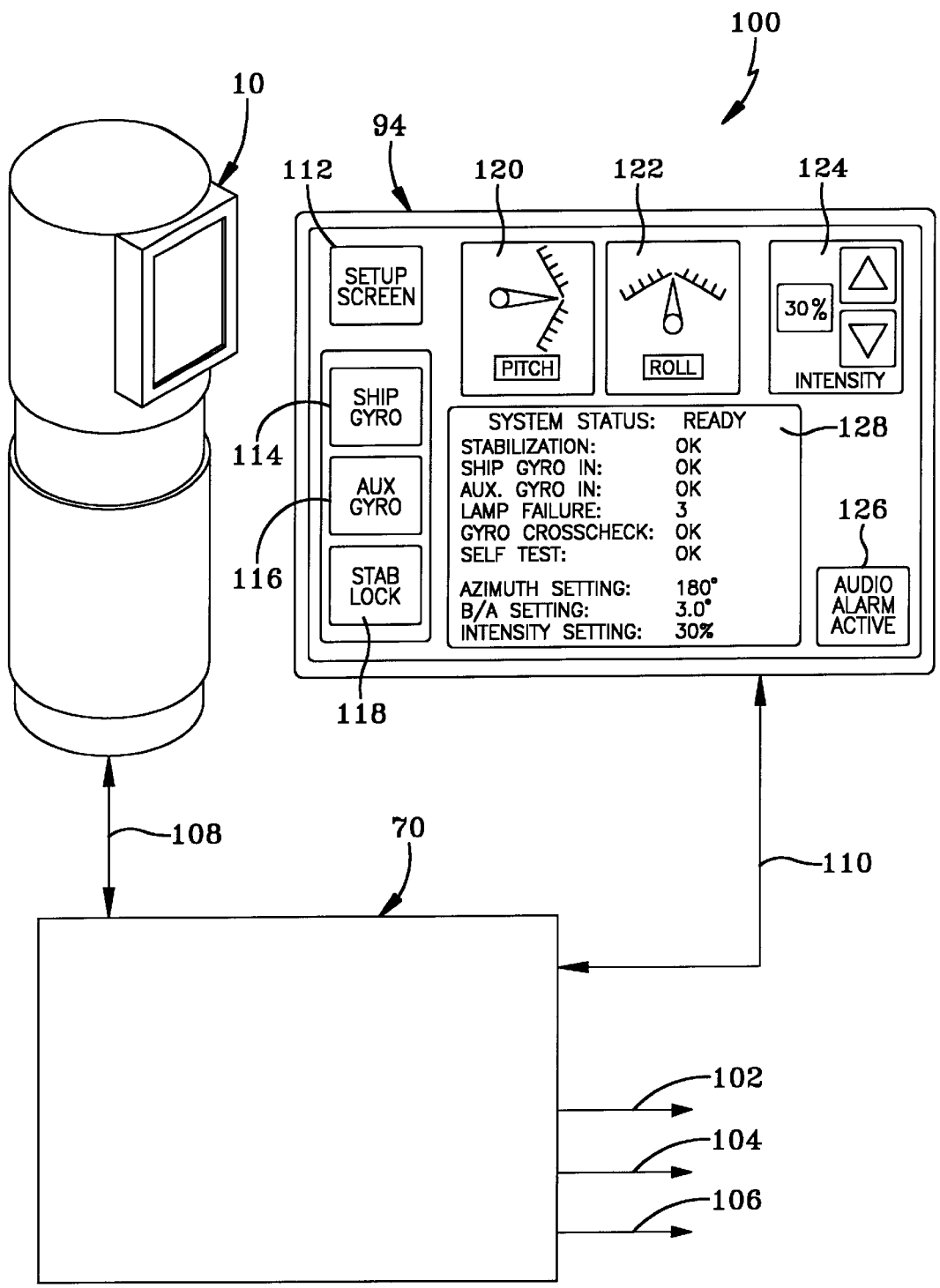
FIG. 5 shows the SGSI display device in relation to interfacing electronic components of the present invention.

FIG. 5 shows the SGSI display device 10 in relation to interfacing electronic subsystems contained within the enclosure 70, to be described hereinafter with reference to FIG. 6, of the SGSI system 100. The SGSI system 100 comprises the remote panel 94 and the enclosure 70, which interfaces to the ship for power and ships gyro information by way of signal. paths 102, 104, and 106 respectively carrying excitation from auxiliary gyro input, excitation from ships power (115 VAC, 60 HZ, 10A) and excitation from ships gyro (pitch and roll) which may be 2× and 36× 90L-L synchros. These signal paths 102, 104, and 106 are included in signal path 28 previously discussed with reference to FIG. 1. The electronics within the enclosure 70 receives information from the remote panel 94 via signal path 110 and also information from the SGSI device 10 via signal path 108. These signal paths 108 and 110 are included in the data bus 34 previously discussed with reference to FIG. 1. The remote panel 94 comprises a plurality of conventional command controls 112, 114, 116, 118, 120, 122, 124, and 126 and a command display 128.

The SGSI device 10 is located along the pilot's line of site in the approach path to the ship. This usually requires that it be placed 15 to 25 feet above the flight deck 36. On most ships it is placed on the hanger top or located forward from the landing pad to maintain a safe hover height above the pad. The remote panel 94 is typically located in the flight control area just forward of the landing pad. The electronics enclosure 70 is located in a convenient access within 250 feet, of the SGSI display device 10. The only connections between panels 94 and 70 are power and serial communications cables. This generally requires only the use of small cables affording reduced installation and maintenance costs. Furthermore, the cabling comprising signal path 108 is brought into the SGSI display device 10 through its lower end (as seen in FIG. 5) which advantageously reduces the electromagnetic radiation to which the signals therein are subjected.

FIG. 6 shows, in block diagram form, an electronic subsystem 128 contained within enclosure 70 and remote panel 94 providing a digital closed loop control of the SGSI display device 10. As shown in FIG. 6, the remote panel 94 comprises a display 130, a microprocessor 132, a power supply 134, and a serial interface (RS-422) arrangement 136. The devices of the remote panel 94 are interconnected to the enclosure 70 and then to the electronic subsystem 128 by way of signal path 108.

The electronic subsystem 128 comprises a display 138, a microprocessor 140, power supplies 142, power conditioning devices 144, auxiliary gyro interface logic 145, synchro to digital converter 146, and a three serial interface arrangement 148 each operating under the protocol established by the digital serial transmission scheme RS-422 format known in the art. The enclosure 70 and the electronic subsystem 128 is connected to the SGSI display device 10 by way of signal path 110.

The SGSI display device 10, shown in FIG. 6, comprises power supplies 150, heaters 152, serial interface device 156, serial interface device 158, built-in test display and control 160, microprocessor 162, microprocessor 164, motor drivers and encoder multiplexes 166, lamp dimmer and lamp mirror motor 168, mirror encoder 78, mirror motor 74, drum encoder 100, drum motor 98, azimuth brake solenoid 88, azimuth encoder 84, and azimuth motor 68.

FIG. 6 further illustrates the first actuator assembly 20 which controls the positioning of the reflective mirror 18 and is comprised of mirror encoder 78 and the mirror motor 74, the second actuator assembly 22 which controls the positioning of the drum assembly 14 and is comprised of drum encoder 100 and drum motor 98, and the third actuator assembly 24 which controls the azimuth positioning of the head member 38 and is comprised of the azimuth brake solenoid 88, the azimuth encoder 84 and the azimuth motor 68. The elements of the SGSI display device 10 are arranged as shown in FIG. 6.

FIG. 6 shows four microprocessors 132, 140, 162 and 164, with microprocessors 162 and 164 preferably each being an Intel 87C51FB processor, but it should be noted that these four microprocessors 132, 140, 162 and 164 are considered to be included in the signal processor 26 of FIG. 1. Further, FIG. 6 shows bilateral data paths 108 and 110, each operating under a RS-422 protocol, but it should be noted these two data paths 108 and 110 are considered to be included in the data bus 34 of FIG. 1. Furthermore, all of the electronic elements of FIG. 6 are conventional and their operation is known in the art.

The first 20, second 22, and third 24 actuator assemblies of the SGSI display device 10 all operate in a digital controlled loop, known in the art, whereby the control elements, e.g., the mirror motor 74 and mirror encoder 78 of the first actuator assembly 20, operatively cooperate with each other until the actual position of reflecting mirror 18 is at its desired position determined by the microprocessor 162 having inputs from the marine structure 30 (see FIG. 1) by way of elements 145, 146, and 148 of electronic subsystem 128 and element 156 of the SGSI display device 10.

The SGSI system 100 is interfaced to ship power and gyro information through the electronic subsystem 128. An interface arrangement 145 is provided for an auxiliary gyro to be used as a redundant input and as a cross check to the accuracy of the ship's gyro. Power from the ship is connected to the electronic subsystem 128, by way of signal path 106, and goes through a power-conditioning module 144. Power is then distributed to the remote panel 94 through signal path 108 and to the SGSI display device 10 by way of signal path 110. Synchro signals from the ship's gyro are digitized in a multi-channel synchro to digital interface device 146, under control of microprocessor 140. When an auxiliary gyro or derived position sensor is available the microprocessor 140 can digitize an input signal through the auxiliary gyro interface 145 and then compare its position with the ship's gyro to determine if both gyros (auxiliary and ship's) are operating properly. If there is a difference and a potential error, the microprocessor 140 provides an alarm to the operator via signal path 108 and the remote panel 94 for action. Each of the three subsystems (94, 128, and 10), shown in FIG. 6, contains a display (130, 138, and 160) that is used for individually testing each self-contained enclosure and displaying diagnostic information. The microprocessor 140 performs the stabilization calculations, to be further described, and transmits control information between the remote panel 94 and the SGSI display device 10.

The SGSI system 100 is controlled from the remote panel 94 preferably located within a flight control station on a ship. In a preferred operation, the system is turned on at the remote station and the basic angle (glide slope offset), azimuth angle (approach direction), and lamp intensity is set by the operator. The details for such controls are not considered part of the present invention. The SGSI system 100 goes through an initialization process and error tests and reports status back to the remote panel 94 for the operator to ascertain system status. The SGSI display device 10 transmits its azimuth position back, by way of azimuth encoder 84, to the electronics subsystem 128 where this position is used along with the pitch and roll input signals from the ship gyro, by way of element 146, to compute the desired reflecting mirror 18 and drum assembly 14 positions. This positioning is scaled to the same scaling as the azimuth encoder 84 feedback to reduce computations in the SGSI display device 10. To properly stabilize the optical presentation from the SGSI display device 10, the ship pitch and roll input signals need to be transformed into the rotated azimuth coordinate system of the SGSI display device 10 to determine the angles required for the reflecting mirror 18 and drum assembly 14 along their respective axis. This is accomplished by choosing three points on a line in inertial space that are located an arbitrary distance from the origin of the SGSI display device 10. This control and stabilization is provided by the following steps using the following equations (1)–(15).

In the operation of the SGSI system 100 it is desired to first establish a coordinate system preferably based upon a Cartesian coordinate system where the y-axis is positive aft along the length of the ship, the x-axis is positive to port and the z-axis is positive in an up direction. Next three points are located in the x-y plane, these are designated A, B and C where C is on the y-axis. These points are listed below in matrix form.

$$A = \begin{bmatrix} 20 \\ 100 \\ 0 \end{bmatrix} \quad B = \begin{bmatrix} -20 \\ 100 \\ 0 \end{bmatrix} \quad C = \begin{bmatrix} 0 \\ 100 \\ 0 \end{bmatrix} \quad (1)$$

Then by using Euler transforms, these coordinates are translated into a rotated pitch, roll and azimuth coordinate system. PT is the pitch transform, RT is the roll transform and YT is the yaw or azimuth transform. The ship pitch is represented by sp, sr is ship roll and ly is azimuth or yaw rotation of the SGSI display device 10.

$$PT = \begin{bmatrix} 1 & 0 & 0 \\ 0 & \cos(sp) & \sin(sp) \\ 0 & -\sin(sp) & \cos(sp) \end{bmatrix} \quad (2)$$

$$RT = \begin{bmatrix} \cos(sr) & 0 & -\sin(sr) \\ 0 & 1 & 0 \\ \sin(sr) & 0 & \cos(sr) \end{bmatrix} \quad (3)$$

$$YT = \begin{bmatrix} \cos(ly) & \sin(ly) & 0 \\ -\sin(ly) & \cos(ly) & 0 \\ 0 & 0 & 1 \end{bmatrix} \quad (4)$$

Next the points are transformed to the azimuth angle of the SGSI device by the following matrix multiplication:

$$LA = YT \cdot A \quad (5)$$

$$LB = YT \cdot B \quad (6)$$

$$LC = YT \cdot C \quad (7)$$

The points are then transformed to the rotated ship coordinates as follows:

$$LSA = RT \cdot PT \cdot LA \quad (8)$$

$$LSB = RT \cdot PT \cdot LB \quad (9)$$

$$LSC = RT \cdot PT \cdot LC \quad (10)$$

The SGSI display device 10 then rolls its beam, contained within the light pattern 46 of FIG. 2, so that points A and B are parallel to the original x-y inertial reference plane. The Greek symbol alpha a is the desired roll of the SGSI display panel 10. This is calculated by taking the arc sine of the difference in height (z-axis) between points A and B divided by the distance between the points as follows:

$$\alpha = a\sin\left[\frac{(LSB_2 - LSA_2)}{(1 - (1 - \cos(sr))\sin(ly))\sqrt{(A_0 - B_0)^2 + (A_1 - B_1)^2 + (A_2 - B_2)^2}}\right] \quad (11)$$

Instead of implementing the above matrix transforms in the processor the elements are pre-multiplied to reduce processing time. The resulting equation is:

$$\text{ALPHA} = \\ (-\sin(sr)\cos(ly) - \sin(ly)\sin(sp)\cos(sr))\frac{1}{1 - (1 - \cos(sr))\sin(ly)} \quad (12)$$

The SGSI display device 10 is then pitched so line A-B is contained in the original x-y plane as follows:
The SGSI display device 10 is then pitched so line A-B is contained in the original x-y plane as follows:

$$\beta = a\sin\left[\frac{LSC_2}{C_1(1 - (1 - \cos(sr))\cos(ly))}\right] \quad (13)$$

Instead of using this equation (13) it is manipulated by premultiplying out all of the terms. This results in the following equation for the pitch angle (Beta) or mirror axis of the SGSI.

$$BE = \sin(sr)\sin(ly) - \cos(ly)\cos(sr)\sin(sp) \quad (14)$$

$$\text{Beta} = a\sin\left[\frac{BE}{1 - (1 - \cos(sr))\cos(ly)}\right] \quad (15)$$

To reduce processing time of these equations the sines and cosines can be approximated by using table lookups stored in microprocessor 140. Once the reflecting mirror 18 and drum assembly 14 positions are calculated in the processor 140, they are sent continuously to the SGSI display device 10 through the RS-422 serial interface device 148. The stabilization commands sent to the SGSI display device 10 are scaled to match the feedback encoders (78, 100, and 84). The data is preferably sent continuously at 19.2 kilo-baud and the data words are small so as to minimize the update time. Azimuth command information generated by the microprocessor 140 is only sent when the SGSI display device 10 is to be pointed to a different approach angle. The SGSI display device 10 optimally sends its status information back to the electronics subsystem 128 over a separate serial interface, that is, serial interface device 158, so as not to interfere with the angle commands being sent to the optics head, by way of serial interface device 156 and microprocessor 162. The angle commands may include those to drive motor 68. Further, commands for controlling the flashing information of the vertical stack 62 may also be handled by microprocessor 164. The status information of the SGSI display device 10 is reformatted by microprocessor 140 and sent to the remote panel 94 over the associated RS-422 serial devices.

In addition to the three servo motors and encoders in the SGSI display device 10, the SGSI display device 10 also preferably contains power conditioning and power supplies 150, a pulse width modulated lamp dimmer included in elements 168, heaters 152 for de-misting and deicing, and the microprocessors 162 and 164 in the SGSI device 10. Preferably microprocessor 162 performs all of the stabilization and receives serial data input and microprocessor 164 communicates with microprocessor 162 and performs status checks, error checks and sends status data back to the electronics subsystem 128 through serial interface 158.

It should now be appreciated that the practice of the present invention provides a passive visual landing guidance system that includes methods for compensating for landing area platform motions of pitch and roll and that presents visual cues to a pilot in an integrated format of stable glide slope information that includes visible and infrared energy resulting in increased flight safety and reduced pilot workload.

Since many modifications, variations and changes in detail may be made to the above described embodiment, it is intended that all matter described in the foregoing descriptions and shown in the accompanying drawings be interrupted as illustrative and not in a limiting sense.

What I claim is:

1. A landing guidance system mountable on a marine structure and having sensors that provide output signals indicative of motion being experienced by said marine structure, said landing guidance system comprising:
   (a) a signal processor receiving said output signals of said sensors and generating output signals representative of stabilization corrections; and
   (b) a display subsystem confined within an enclosure and having optical components in a housing and comprising;
      (i) a source of visual and infrared information;
      (ii) a mirror rotatable to predetermined positions and presenting said visual and infrared information;
      (iii) a first actuator assembly interconnected to said rotatable mirror and responsive to said output signals of said signal processor so as to compensate said predetermined positions of said rotatable mirror relative to said motion of said marine structure;
      (iv) a second actuator assembly interconnected to said housing of said optical components and responsive to said output signals of said signal processor so as to move said housing relative to said rotatable mirror and compensate for said motion of said marine structure; and
      (v) a third actuator assembly interconnected to said enclosure of said display subsystem and responsive to said output signals of said signal processor so as to compensate the orientation of said enclosure of said display subsystem for said motion being experienced by said marine structure.

2. The landing guidance system according to claim 1, wherein said display subsystem has a field of view and said source providing said visual information is contained in beam within said field of view and that has three regions that respectively contain red, yellow and green colors.

3. The landing guidance system according to claim 2, wherein said three regions comprise lower, center and uppers sections that respectively contain said red, yellow and green colors.

4. The landing guidance system according to claim 3, wherein said field of view is about 40 degrees in the horizontal and said red, yellow and green respectively occupy 6.5 degrees, one (1) degree and one and one-half (1.5) degrees of said field of view in the vertical.

5. The landing guidance system according to claim 4, wherein said source comprises a filter having dichroic coatings providing said red, yellow and green colors.

6. The landing guidance system according to claim 1, wherein said source of infrared information comprises an array of near infrared light emitting diodes arranged in a vertical stack.

7. The landing guidance system according to claim 6, wherein said source of infrared information further comprises means for varying the rate and data cycle of said near infrared light emitting diodes.

8. The landing guidance system according to claim 1, wherein said source further comprises a beam splitter that combines said visual and infrared information into one beam.

9. The landing guidance system according to claim 1, wherein said display system further comprises heaters.

10. The landing guidance system according to claim 1, wherein said source of visual information comprises a plurality of reflector lamps that are selected by a rotatable mirror.

11. The landing guidance system according to claim 1, wherein said signal processor and said display subsystem are interconnected by a serial data interface.

12. The landing guidance system according to claim 1, wherein said first actuator assembly comprises a motor and an encoder.

13. The landing guidance system according to claim 1, wherein said second actuator assembly comprises a motor and an encoder.

14. The landing guidance system according to claim 1, wherein said third actuator assembly comprises an encoder, a motor, and a brake solenoid that controls said motor of said third actuator.

15. A display subsystem confined within an enclosure and having optical components in a housing, said display subsystem comprising:
   (a) a source of visual and infrared information;
   (b) a mirror rotatable to predetermined positions and presenting said visual and infrared information;
   (c) a first actuator assembly interconnected to said rotatable mirror and responsive output signals of a signal processor so as to compensate said predetermined positions of said rotatable mirror;
   (d) a second actuator assembly interconnected to said housing of said optical components and responsive to said output signals of said signal processor so as to move said housing relative to said rotatable mirror; and
   (e) a third actuator assembly interconnected to said enclosure of said display subsystem and responsive to said output signals of said signal processor so as to compensate for the orientation of said enclosure of said display subsystem.

16. The display subsystem according to claim 15, wherein said display subsystem has a field of view and said source providing said visual information is contained in beam within said field of view that has three regions that respectively contain red, yellow and green colors.

17. The display system according to claim 16, wherein said three regions comprise lower, center and upper sections that respective contain said red, yellow and green colors.

18. The display system according to claim 17, wherein said field of view is about 40 degrees in the horizontal and said red, yellow and green respectively occupy 6.5 degrees, one (1) degree and one and one-half (1.5) degrees of said field of view in the vertical.

19. The display subsystem according to claim 18, wherein said source comprises a filter having dichroic coatings providing said red, yellow and green colors.

20. The display subsystem according to claim 15, wherein said source of infrared information comprises an array of near infrared light emitting diodes arranged in a vertical stack.

21. The display subsystem according to claim 15, wherein said second actuator assembly comprises a motor and an encoder.

22. The display subsystem according to claim 15, wherein said source further comprises a beam splitter that combines said visual and infrared information into one beam.

23. The display subsystem according to claim 15, wherein said display system further comprises heaters.

24. The display subsystem according to claim 15, wherein said source comprises a plurality of reflector lamps that are selected by a rotatable mirror.

25. The display subsystem according to claim 15, wherein said first actuator assembly comprises a motor and an encoder.

26. The display subsystem according to claim 21, wherein said source of infrared information further comprises means for varying the rate and duty cycle of said near infrared light emitting diodes.

27. The display subsystem according to claim 15, wherein said third actuator assembly comprises an encoder, a motor, and brake solenoid that controls said motor of said third actuator.

28. A method for providing a landing guidance system mountable on a marine structure having sensors that provide output signal indicative of motion being experienced by said marine structure, said method comprising the steps of:

(a) providing a signal processor for receiving said output signals of said sensors and for generating output signals representative of stabilization corrections;

(b) providing a display subsystem confined within an enclosure and having optical components in a housing and comprising;

(i) a source of visual and infrared information;

(ii) a mirror rotatable to predetermined positions and presenting said visual and infrared information;

(iii) a first actuator assembly interconnected to said rotatable mirror and responsive to said output signals of said signal processor so as to compensate said predetermined positions of said rotatable mirror relative to said motion of said marine structure;

(iv) a second actuator assembly interconnected to said housing of said optical components and responsive to said output signals of said signal processor so as to move said housing relative to said rotatable mirror and compensate for said motion of said marine structure; and (v) a third actuator assembly interconnected to said enclosure of said display subsystem and responsive to said output signals of said signal processor so as to compensate the orientation of said enclosure of said display subsystem.

29. The method according to claim 28, wherein said display subsystem has a field of view and said source providing said visual information is contained in beam within said field of view and that has three regions that respectively contain red, yellow and green colors.

30. The method according to claim 29, wherein said three regions comprise lower, center and upper sections that respectively contain said red, yellow and green colors.

31. The method according to claim 30, wherein said field of view is about 40 degrees in the horizontal and said red, yellow and green respectively occupy 6.5 degrees, one (1) degree and one and one-half (1.5) degrees of said field of view in the vertical.

32. The method according to claim 31, wherein said source comprises a filter having dichroic coatings providing said red, yellow and green colors.

33. The method according to claim 28, wherein said source of infrared information comprises an array of near infrared light emitting diodes arranged in a vertical stack.

34. The method according to claim 33, wherein said source of infrared information further comprises means for varying the rate and duty cycle of said near infrared light emitting diodes.

35. The method according to claim 28, wherein said source further comprises a beam splitter that combines said visual and infrared information into one beam.

36. The method according to claim 28, wherein said first actuator assembly comprises a motor and an encoder.

37. The method according to claim 28, wherein said second actuator assembly comprises a motor and an encoder.

38. The method according to claim 28, wherein said third actuator assembly comprises an encoder, a motor, and brake solenoid that controls said motor of said third actuator.

* * * * *